US010007048B2

(12) United States Patent
Schmidt et al.

(10) Patent No.: US 10,007,048 B2
(45) Date of Patent: Jun. 26, 2018

(54) LIGHT GUIDE BODY HAVING HIGH LUMINOUS INTENSITY AND HIGH TRANSPARENCY

(71) Applicants: Jann Schmidt, Weiterstadt (DE); Wojciech Pisula, Mainz (DE); Peter Stein, Muehltal (DE); Christian Roth, Lautertal (DE); Sabine Schwarz-Barac, Riedstadt (DE); Heiko Rochholz, Ruemmelsheim (DE); Alexander Baum, Frankfurt (DE)

(72) Inventors: Jann Schmidt, Weiterstadt (DE); Wojciech Pisula, Mainz (DE); Peter Stein, Muehltal (DE); Christian Roth, Lautertal (DE); Sabine Schwarz-Barac, Riedstadt (DE); Heiko Rochholz, Ruemmelsheim (DE); Alexander Baum, Frankfurt (DE)

(73) Assignee: EVONIK ROEHM GmbH, Darmstadt (DE)

( * ) Notice: Subject to any disclaimer, the term of this patent is extended or adjusted under 35 U.S.C. 154(b) by 0 days. days.

(21) Appl. No.: 15/284,002

(22) Filed: Oct. 3, 2016

(65) Prior Publication Data
US 2017/0023722 A1    Jan. 26, 2017

Related U.S. Application Data

(63) Continuation of application No. 13/030,315, filed on Feb. 18, 2011.

(30) Foreign Application Priority Data

Apr. 8, 2010   (EP) .................................... 10159342
Nov. 11, 2010  (DE) ........................ 10 2010 043 743

(51) Int. Cl.
*G02B 6/10*    (2006.01)
*F21V 8/00*    (2006.01)

(52) U.S. Cl.
CPC ......... *G02B 6/0041* (2013.01); *G02B 6/0055* (2013.01); *G02B 6/0065* (2013.01); *G02B 6/0061* (2013.01)

(58) Field of Classification Search
None
See application file for complete search history.

(56) References Cited

U.S. PATENT DOCUMENTS 5,055,978 A  *  10/1991  Rogoff ................. G02B 6/0031
                                              362/23.13
5,202,950 A  *  4/1993   Arego ...................... F21V 7/00
                                              349/65

(Continued)

FOREIGN PATENT DOCUMENTS

JP    2004-351649    12/2004
JP    2006-024439    1/2006

(Continued)

OTHER PUBLICATIONS

European Search Report dated May 23, 2011, in PCT/EP2011/052706.

*Primary Examiner* — Chris Chu
(74) *Attorney, Agent, or Firm* — Oblon, McClelland, Maier & Neustadt, L.L.P.

(57) ABSTRACT

The present invention relates to light guide bodies having improved luminous intensity and transparency, to a method for their production and to their use.

15 Claims, 7 Drawing Sheets

(56) References Cited

U.S. PATENT DOCUMENTS

| | | | |
|---|---|---|---|
| 7,046,903 B2 | 5/2006 | Schmidt et al. | |
| 7,513,674 B1 | 4/2009 | Donahue | |
| 7,864,395 B2* | 1/2011 | Chui | G02B 6/0041 359/245 |
| 2002/0101549 A1* | 8/2002 | Katsu | G02B 6/0031 349/65 |
| 2005/0084993 A1* | 4/2005 | Schmidt | G02B 6/0065 438/22 |
| 2005/0117369 A1 | 6/2005 | Liu | |
| 2005/0239581 A1 | 10/2005 | Naylor, Sr. et al. | |
| 2005/0272879 A1* | 12/2005 | Kawai | C08F 220/12 525/418 |
| 2006/0002137 A1* | 1/2006 | Kim | G02B 6/0091 362/600 |
| 2007/0013873 A9* | 1/2007 | Jacobson | G03B 21/10 353/30 |
| 2007/0133935 A1 | 6/2007 | Fine | |
| 2008/0132429 A1* | 6/2008 | Perov | B01J 19/0046 506/32 |
| 2008/0186559 A1* | 8/2008 | Willard | G02F 1/1533 359/265 |
| 2008/0224339 A1 | 9/2008 | Schmidt et al. | |
| 2008/0272367 A1* | 11/2008 | Cok | H01L 51/5253 257/40 |
| 2009/0211720 A1* | 8/2009 | Myllymaki | C08J 3/096 162/176 |
| 2010/0014315 A1* | 1/2010 | Fujimoto | G02B 6/001 362/615 |
| 2011/0017203 A1 | 1/2011 | Luepfert | |
| 2013/0343088 A1 | 12/2013 | Parusel et al. | |

FOREIGN PATENT DOCUMENTS

| | | |
|---|---|---|
| JP | 2009-212076 | 9/2009 |
| WO | WO 2007/058060 A1 | 5/2007 |
| WO | WO 2009/137053 A1 | 11/2009 |

* cited by examiner

LIGHT GUIDE BODY HAVING HIGH LUMINOUS INTENSITY AND HIGH TRANSPARENCY

CROSS-REFERENCE TO RELATED APPLICATIONS

This application is a continuation of U.S. Ser. No. 13/030,315 filed Feb. 18, 2011, pending, and claims the benefit of DE 102010043743.3 filed Nov. 11, 2010 and EP 10159342 filed Apr. 8, 2010.

FIELD OF THE INVENTION

The present invention relates to light guide bodies having improved luminous intensity and transparency, to a method for their production and to their use.

BACKGROUND OF THE INVENTION

Light guide bodies which are based on the principle of embedding scattering particles in a transparent thermoplastic matrix are known.

For instance, EP 656 548 discloses light guide bodies which use polymer particles as scattering particles. More than 98% of the polymer particles have a size of at least 7 micrometers, and from 0.01 wt % (100 wt.ppm) to 1 wt % (10,000 wt.ppm) of them are added to a matrix plastic. These light guide bodies have the disadvantage that their weathering resistance is insufficient and they already exhibit cloudiness—expressed by the "haze" value—at a thickness of 1 mm, in particular above 2 mm.

EP 1453900 describes light guide bodies which contain barium sulphate with an average particle size of 0.3-20-micrometers as scattering particles in a concentration of 0.001 wt % (10 wt.ppm)—0.08 wt % (800 wt.ppm). These light guide bodies also have the disadvantage that they already exhibit cloudiness at a thickness of 1 mm, in particular above 2 mm.

The above-described light guide bodies of the prior art also have the disadvantage that a low luminance is achieved with observation perpendicular to the light emitting surface. Only at large angles, measured with respect to the surface normal of the light emitting surface (cf. FIG. 1), does the luminance increase significantly. This effect is represented in FIG. 2 for various scattering particles.

Besides light guide bodies comprising scattering particles, there are also light guide bodies which are produced by mechanical introduction of defects on the surface or by printing on the surface. Production of these light guide bodies, however, involves much greater production outlay. Furthermore, printing in particular causes poor transparency and therefore restricts the possibilities of the use of these light guide bodies. Light guide bodies having embedded scattering particles, conversely, can be produced economically by extrusion, injection moulding or by casting methods without post-processing. Examples of such printed light guide bodies may be found in JP2004351649, WO 2007/058060, WO 2009/137053, US 2005/272879.

SUMMARY OF THE INVENTION

In view of the prior art discussed above, it was therefore an object of the present invention to provide light guide bodies and a method for their production, which do not have the disadvantages of the light guide bodies of the prior art or have them only to a reduced extent.

It was a particular object to provide light guide bodies which exhibit little cloudiness in through-view, i.e. in the direction of the surface normals, and can therefore be used in application fields which are incompatible with light guide bodies of the prior art because of optical requirements.

It was another particular object to provide light guide bodies which have a high luminance at low angles, measured with respect to the surface normal of the light emitting surface.

It was also an object of the invention to provide light guide bodies which can be produced in a particularly simple way, for example by extrusion, injection moulding or by casting methods.

It was furthermore an object of the present invention to provide light guide bodies which can be produced economically.

Lastly, it was also an object of the present invention to provide light guide bodies which can be adapted easily to requirements in respect of size and shape.

Other not explicitly mentioned objects may be inferred from the overall context of the following description, examples and claims.

These objects are achieved by the light guide bodies described in claim 1. Expedient variants of the light guide bodies according to the invention are placed under protection by the dependent claims referring to claim 1.

DETAILED DESCRIPTION OF THE INVENTION

In respect of the method for producing the light guide bodies according to the invention, claims 10 to 12 and the following description provide a solution to the underlying object.

Figure 3:
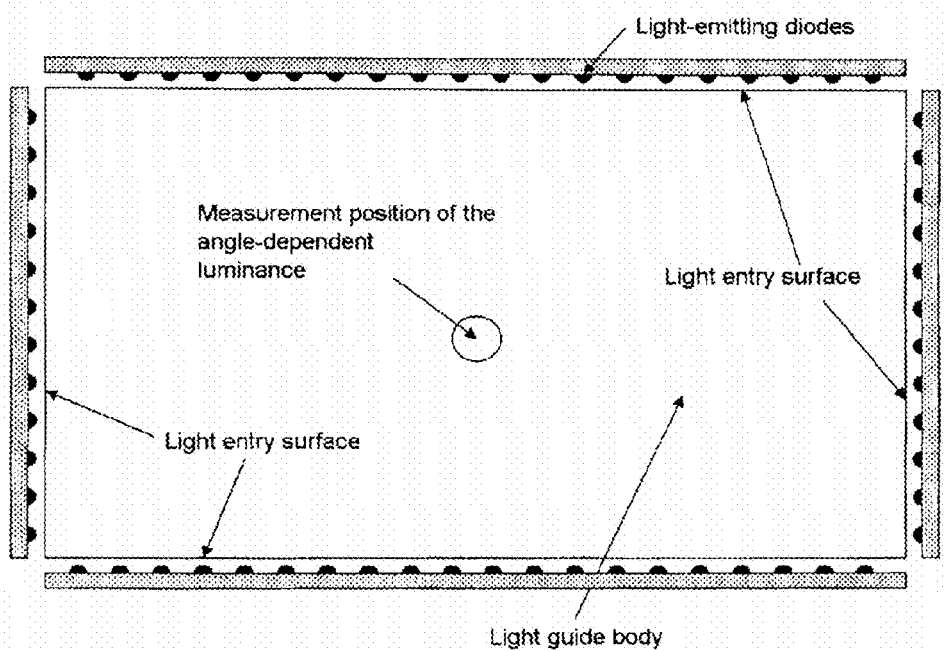
FIG. 3 depicts a light guide body illustrating the entrance of light perpendicular to the light emitting surface.

Before the present invention is described in detail, some important terms will be defined as follows (cf. FIGS. 1 and 3):

The term light emitting surface denotes a surface of the light guide body which is intended to emit light. The light entry surface is in turn capable of receiving light into the light guide body, so that the light guide body can distribute the introduced light substantially uniformly over the light emitting surface(s).

Figure 1:
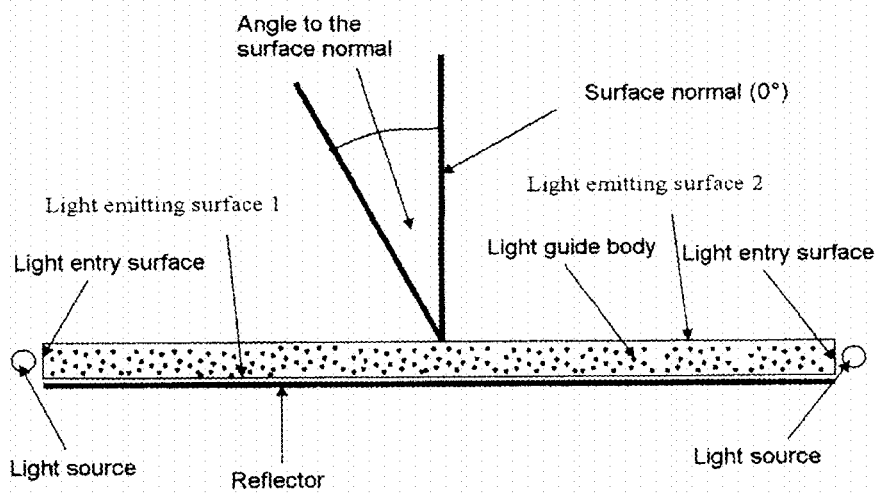
FIG. 1 depicts a light guide body.
Figure 2:
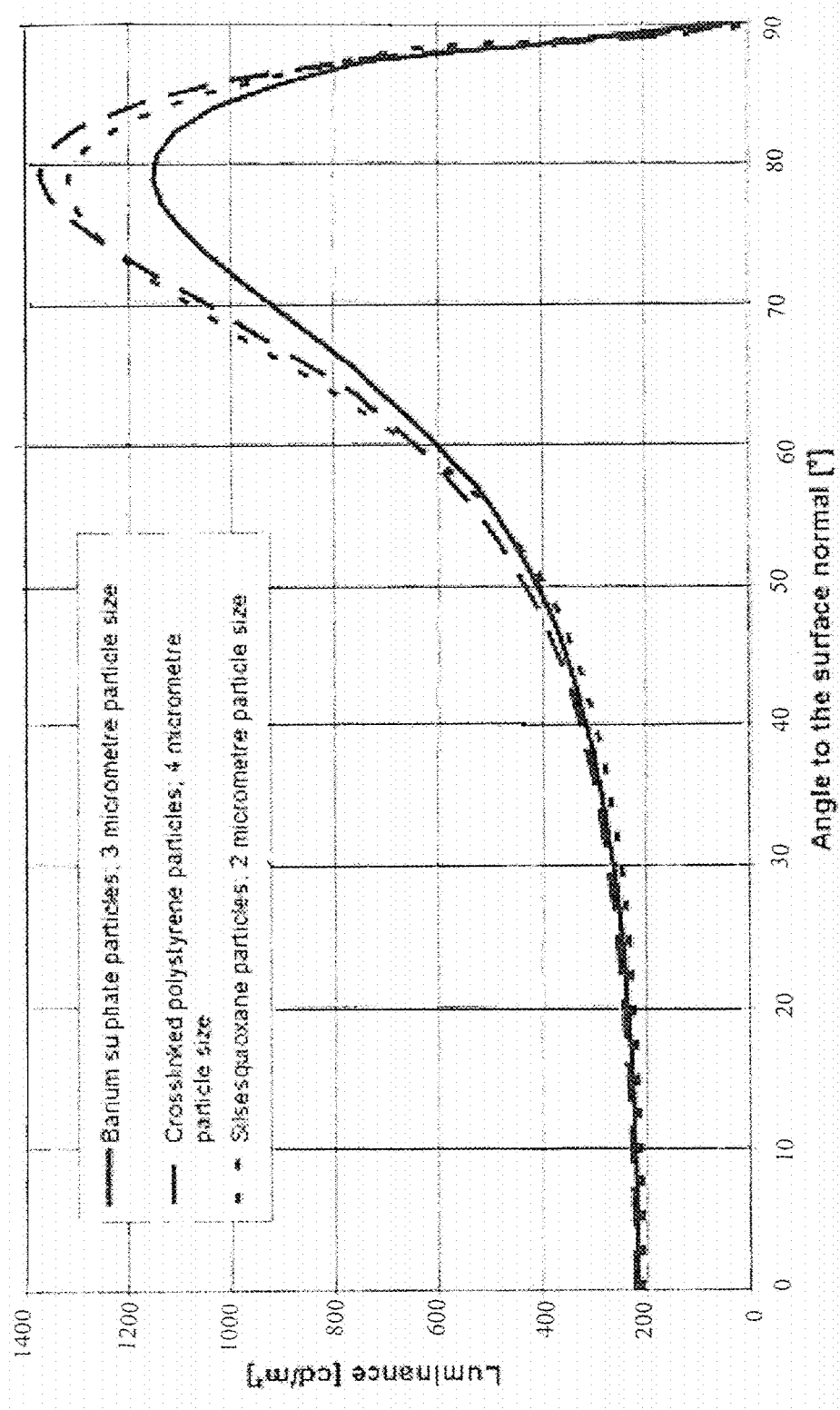
FIG. 2 depicts the effect of luminance as a function of angle to the surface in a light guide body for various scattering particles.

The light guide bodies according to the invention preferably have at least a thickness of 1 mm. The thickness particularly preferably lies in the range of from 2 to 25 mm and more particularly preferably is from 3 to 20 mm. The light guide body may, as indicated in FIG. 1, also be assigned further layers, for example mirror or reflection layers.

Surprisingly, it has been found that the disadvantages of conventional light guide bodies can be overcome by embedding titanium dioxide scattering particles with an average particle size of from 150 to 500 nm. For example, the inventors have found that light guide bodies according to the invention, containing titanium dioxide particles with this special average particle size, are significantly more transparent in comparison with light guide bodies having for example $BaSO_4$ scattering particles, despite a significantly higher light intensity at a small angle with respect to the surface normal of the light emitting surface. The light guide bodies according to the invention preferably have a thickness—measured at the thinnest position—of at least 1 mm, particularly preferably from 2 to 25 mm and more particularly preferably from 3 to 20 mm. The light guide bodies according to the invention are also distinguished by very low cloudiness, measured as haze according to ASTM D1003, which is less than 4%, preferably less than 2%, particularly preferably from 0.2 to 2%. In contrast to the light guide bodies of the prior art, the light guide bodies according to the invention therefore appear substantially transparent to the human eye and can also be used in application fields which have great requirements for optical properties. The light guide bodies according to the invention are particularly preferably distinguished in that they have no printing perceptible to the human eye at an observation distance of 1 m, and more particularly preferably no printing at all, in particular with dyes, on the surface or in another layer of the shaped body. In another preferred embodiment, the light guide bodies according to the invention also have no other optical defects on the surface or in a layer. In contrast to the light guide bodies of the prior art, it has therefore been possible for the first time to achieve very uniform light output over the entire light guide body in combination with a very high transparency thereof, without having to carry out the additional working step of applying printing or defects.

The possibility of being able to obviate printing and defects moreover allows the light guide bodies according to the invention to be configured also as freeform bodies with any desired spatial configuration. In contrast to plate-shaped light guide bodies of the prior art, in which the pattern of the defects or printing can be calculated simply, this is not possible with complicated configurations. In a particularly preferred embodiment, the light guide bodies according to the invention are therefore freeform bodies with high transparency and uniform light output, so that a hitherto impossible configurational freedom is achieved.

Transparent light guide bodies offer many practical as well as decorative applications. For instance, it is possible to configure glazing which ensures a clear, distortion-free and uninterrupted view through when the light source is switched off. When the light sources are switched on, the glazing acts as a uniform flat light source which can be used for general or ambient lighting.

Figure 4:
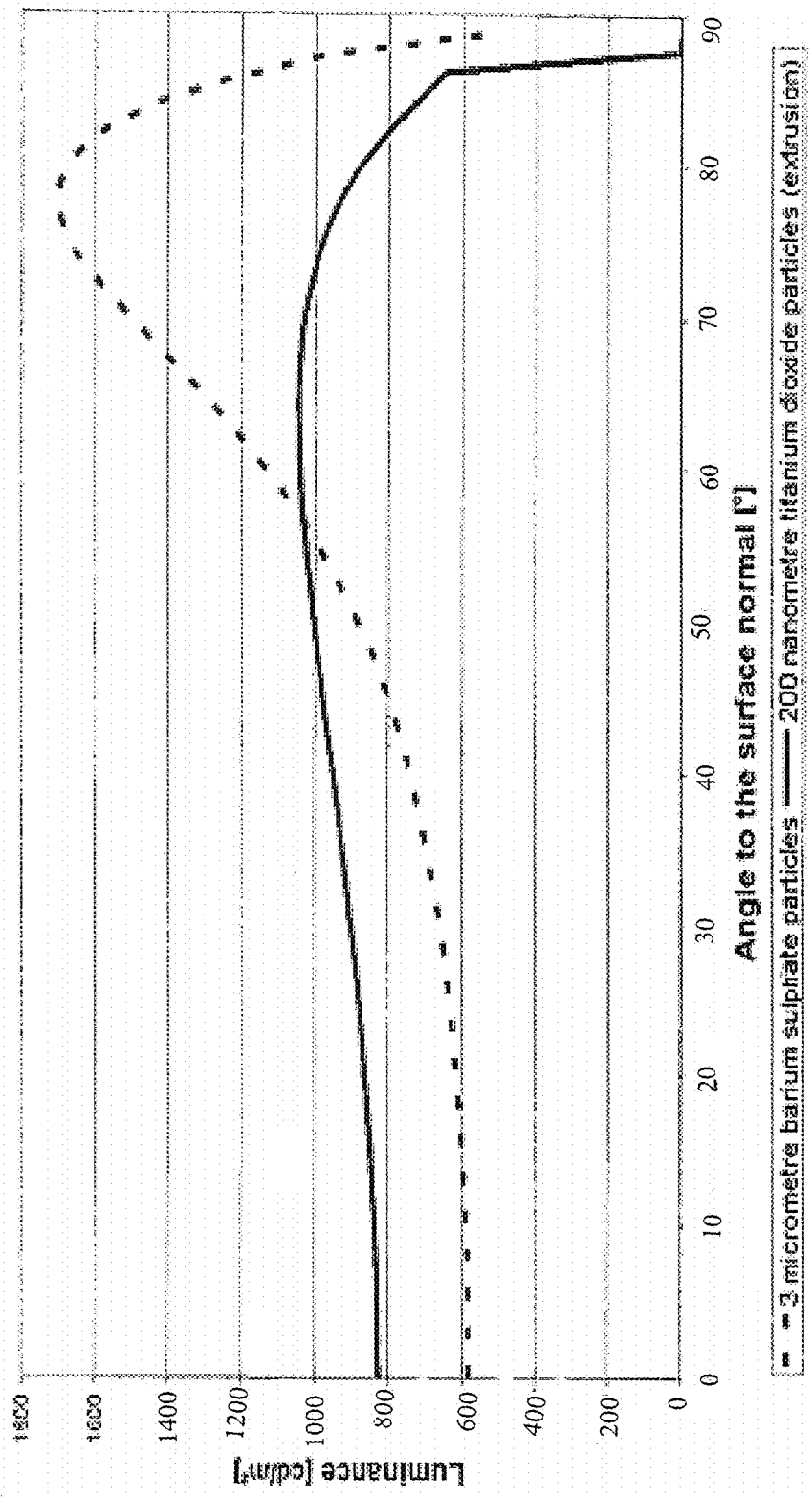
FIG. 4 depicts the effect of luminance as a function of angle to the surface in a light guide body for barium sulfate and titanium dioxide particles.
Figure 5:
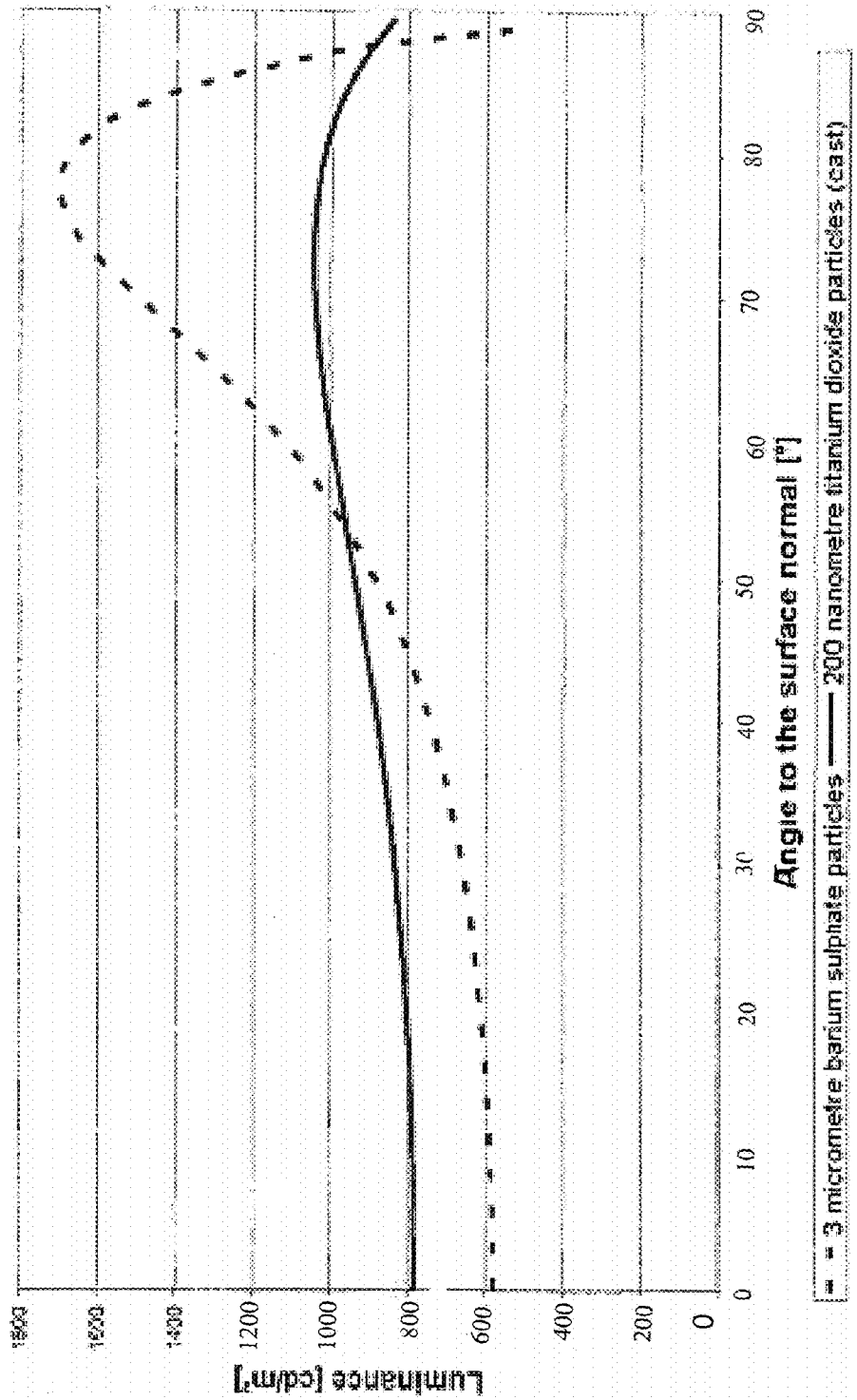
FIG. 5 depicts the effect of luminance as a function of angle to the surface in a light guide body for barium sulfate and titanium dioxide particles.

Light guide bodies, which contain titanium dioxide scattering particles that have an average particle size of from 150 to 500 nm, emit light very much more uniformly over all angles, measured with respect to the surface normal of the light guide bodies, than light guide bodies according to the prior art, for example of EP 1453900. This is represented in FIG. 4 and FIG. 5. The luminance of the light guide bodies according to the invention is therefore significantly higher under perpendicular observation then when conventional scattering particles are used.

Figure 6:
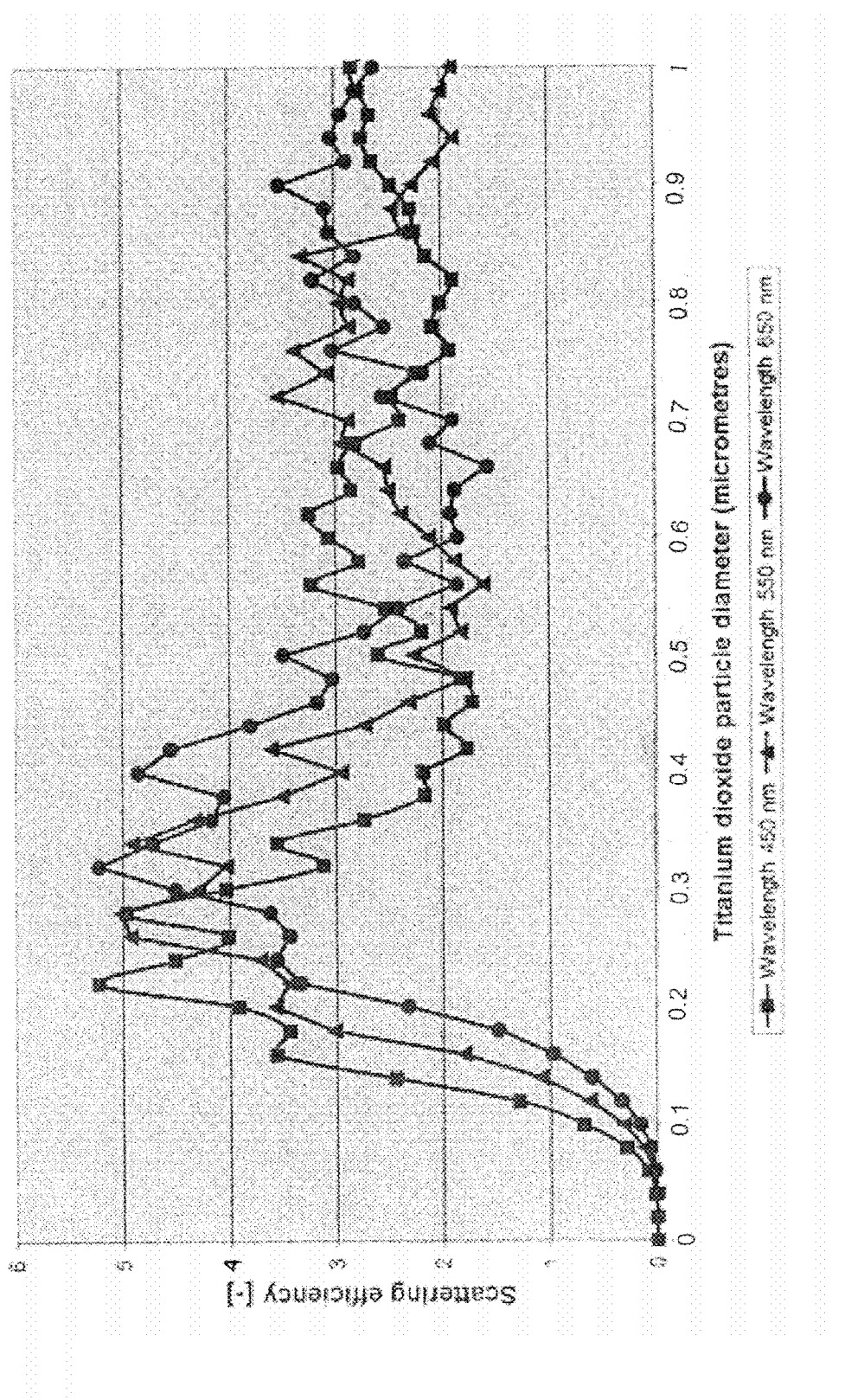
FIG. 6 depicts scattering efficiency as a function of titanium dioxide particle diameter at 400 nm, 500 nm and 650 nm in a light guide body.

The use of titanium dioxide particles as scattering particles in light guide bodies is known per se. JP2002148443 describes, for example, light guide bodies which contain titanium dioxide with a particle size of less than 100 nm. The inventors have, however, discovered that titanium dioxide has its highest scattering efficiency in the scattering bodies according to the invention, almost independently of the wavelength of the light, with a particle size of between 150 and 500 nm. This is illustrated in FIG. 6 with the aid of a Mie scattering simulation of titanium dioxide (rutile modification) in polymethyl methacrylate. Below 150 nm titanium dioxide particles, i.e. those according to JP2002148443, scatter light increasingly wavelength-selectively. That is to say, blue light (wavelength 450 nm) is scattered significantly more than green light (550 nm) and even more so than red light (650 nm). The effect of this is that white light fed into the light guide at the light entry surfaces is demixed on its way through the light guide. At a short distance from the light entry surfaces, the light emerging from the light emitting surfaces is therefore blueish, and at a large distance from the light entry surfaces it is increasingly yellowish to reddish. This leads to a perturbing wavelength dispersion, that is to say the light fed in emerges again with a colour distortion at the light emitting surfaces. This problem is resolved by the present invention. The titanium dioxide particles used according to the invention therefore preferably have an average particle size of from 150 to 500 nm, particularly preferably from 160 to 450 nm, more particularly preferably from 170 to 450 nm, especially preferably from 200 to 400 nm, and more especially preferably from 220 to 400 nm. Titanium dioxide particles which have the aforementioned properties are commercially available (for example KRONOS 2220 from Kronos Titan or HOMBITAN R 610 K from Sachtleben Chemie). Various methods for their production are known.

The proportion of titanium dioxide particles in the light guide body is from 0.1-100 wt.ppm, preferably from 0.1 to 50 wt.ppm and particularly preferably from 0.1 to 10 wt.ppm, in each case expressed in terms of the weight of the light guide body. Despite the improved light intensity, it is therefore possible to achieve a significant reduction of the proportion of scattering particles, and therefore a cost advantage. The reduced proportion also has a positive effect on the transparency, so that even light guide bodies with a thickness of at least 1 mm, preferably at least 2 mm, can be produced with high transparency and scattering intensity. Furthermore, a high ratio of the light emitting surface to the light introduction surface of at least 4, preferably at least 10, particularly preferably at least 20, and more particularly preferably at least 80 can be achieved. This means that the light guide body of the present invention differs to a great extent from known covers for lighting bodies. Specifically, known covers are distinguished in that the light introduction surface is formed parallel to the light emitting surface, so that both surfaces have approximately the same size.

Light guide bodies according to the invention preferably have a length in the range of from 25 mm to 3000 mm, preferably from 50 to 2000 mm and particularly preferably from 200 to 2000 mm. The width preferably lies in the range of from 25 to 3000 mm, preferably from 50 to 2000 mm and particularly preferably from 200 to 2000 mm.

Cubic configurations are possible, but also configurations tapering toward one side, which have a wedge shape. In the case of a wedge shape, light is preferably input only through one light entry surface.

Figure 7:
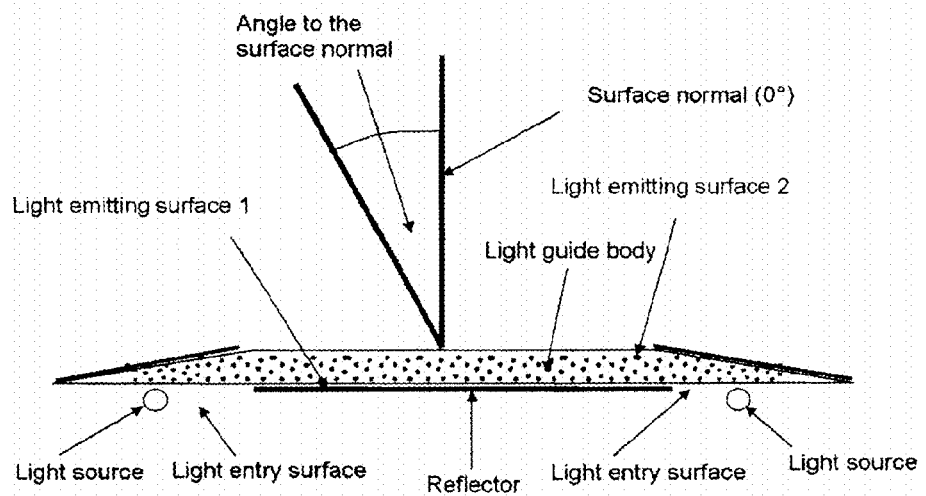
FIG. 7 depicts another embodiment of a light guide body.

The light preferably enters the light guide body perpendicularly to the light emitting surface, i.e. the light entry surface is perpendicular to the light emitting surface. Examples of this embodiment can be found in FIGS. 1 and 3. In an alternative embodiment, however, the light guide bodies according to the invention also allow the light entry surface not to be perpendicular to the light emitting surface and a high light intensity is nevertheless still achieved. This is possible, for example, when the light guide body is configured so that the entering light is guided into the light guide surface by corresponding refraction or reflection at special layers. An example of this is represented in FIG. 7. The light guide bodies according to the invention therefore allow significantly improved configurational latitude for the user or designer.

As a light source for illuminating the light entry surfaces of the light guide bodies according to the invention, fluorescent lamps, light-emitting diodes, incandescent lamps and halogen discharge lamps may be used. Depending on the arrangement of the light sources, the light may be shone in through all four edges. This may be necessary in particular for very large light guide bodies. In the case of smaller light guide bodies, it is generally sufficient to illuminate one or two edges of the light guide body. For better exploitation of the light energy used, those edges which are not provided with a light source may be configured to be reflective. This configuration may for example be carried out using reflective adhesive tapes. Furthermore, a reflective coating may be applied onto these edges.

JP 7020459 describes light guide bodies which contain titanium dioxide in the anatase modification as scattering particles. The inventors have found that titanium dioxide having a high proportion of anatase, in combination with moisture and oxygen, can lead to the accelerated destruction of the light guide body. In a preferred embodiment, the light guide bodies according to the invention therefore comprise titanium dioxide particles having a proportion of the rutile modification equal to at least 50 wt, preferably at least 60 wt %, particularly preferably at least 70 wt % and more particularly at least 90 wt %.

In order to produce the light guide bodies according to the invention, that is to say as transparent thermoplastic or thermoelastic plastics for embedding the titanium dioxide particles, transparent polycarbonates, cyclo-olefin copolymers, polystyrenes, polyesters and particularly (meth)acrylate polymers are suitable.

These (meth)acrylate polymers are generally obtained by radical polymerization of monomer mixtures. The monomer mixtures more particularly preferably contain methyl methacrylate, in particular at least 40 wt % of methyl methacrylate, preferably at least 60 wt % and particularly preferably at least 80 wt %, expressed in terms of the weight of the monomer mixture.

Besides this, these monomer mixtures may contain further (meth)acrylates which are copolymerizable with methyl methacrylate. The expression (meth)acrylates covers methacrylates and acrylates, as well as mixtures of the two. These monomers are widely known. They include inter alia (meth)acrylates which are derived from saturated alcohols, for example methyl acrylate, ethyl (meth)acrylate, propyl (meth)acrylate, n-butyl (meth)acrylate, tert.-butyl (meth)acrylate, pentyl (meth)acrylate and 2-ethylhexyl (meth)acrylate; (meth)acrylates, which are derived from unsaturated alcohols, for example oleyl (meth)acrylate, 2-propynyl (meth)acrylate, allyl (meth)acrylate, vinyl (meth)acrylate; aryl (meth)acrylates such as benzyl (meth)acrylate or phenyl (meth)acrylate, in which case the aryl radicals may respectively be unsubstituted or substituted up to 4 times; cycloalkyl (meth)acrylates, such as 3-vinylcyclohexyl (meth)acrylate, bornyl (meth)acrylate; hydroxylalkyl (meth) acrylates such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)acrylates such as 1,4-butanediol (meth)acrylate, (meth)acrylates of ether alcohols, such as tetrahydrofurfuryl (meth)acrylate, vinyloxyethoxyethyl (meth)acrylate; amides and nitriles of (meth)acrylic acid, such as N-(3-dimethylaminopropyl) (meth)acrylamide, N-(diethylphosphono) (meth)acrylamide, 1-methacryloylamido-2-methyl-2-propanol; methacrylates containing sulfur, such as ethylsulphinylethyl (meth)acrylate, 4-thiocyanatobutyl (meth)acrylate, ethylsulphonylethyl (meth)acrylate, thiocyanatomethyl (meth)acrylate, methylsulphinylmethyl (meth)acrylate, bis((meth)acryloyloxyethyl) sulphide; polyvalent (meth)acrylates such as trimethyloylpropane tri(meth)acrylate.

Besides the (meth)acrylates mentioned above, the compositions to be polymerized may also comprise further unsaturated monomers which are copolymerizable with methyl methacrylate and the aforementioned (meth)acrylates.

These include inter alia 1-alkenes such as hexene-1, heptene-1; branched alkenes, for example vinylcyclohexane, 3,3-dimethyl-1-propene, 3-methyl-1-diisobutylene, 4-methylpentene-1; acrylonitrile; vinyl esters such as vinyl acetate; styrene, substituted styrenes having an alkyl substituent in the side chain, for example α-methylstyrene and α-ethylstyrene, substituted styrenes having an alkyl substituent on the ring, such as vinyl toluene and p-methylstyrene, halogenated styrenes, for example monochlorostyrenes, dichlorostyrenes, tribromostyrenes and tetrabromostyrenes; heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives, for example maleic anhydride, methylmaleic anhydride, maleinimide, methylmaleimide; and dienes, for example divinylbenzene.

In general, these comonomers are used in an amount of from 0 to 60 wt %, preferably 0 to 40 wt % and particularly preferably 0 to 20 wt %, expressed in terms of the weight of the monomers, in which case the compounds may be used individually or as a mixture.

The polymerization is generally started using known radical initiators. The preferred initiators include inter alia the azo initiators widely known in the technical field, such as AIBN and 1,1-azobiscyclohexanecarbonitrile, and peroxy compounds, such as methylethylketone peroxide, acetylacetone peroxide, dilauryl peroxide, tert.-butylper-2-ethyl hexanoate, ketone peroxide, methylisobutylketone peroxide, cyclohexanone peroxide, dibenzoyl peroxide, tert.-butylperoxybenzoate, tert.-butylperoxyisopropyl carbonate, 2,5-bis (2-ethylhexanoylperoxy)-2,5-dimethylhexane, tert.-butylperoxy-2-ethyl hexanoate, tert.-butylperoxy-3,5,5-trimethyl hexanoate, dicumyl peroxide, 1,1-bis(tert.-butylperoxy)cyclohexane, 1,1-bis(tert.-butylperoxy)-3,3,5-trimethylcyclohexane, cumyl hydroperoxide, tert.-butyl hydroperoxide, bis(4-tert.-butylcyclohexyl) peroxydicarbonate, mixtures of two or more of the aforementioned compounds with one another and mixtures of the aforementioned compounds with compounds not mentioned, which can likewise form radicals.

These compounds are often used in an amount of from 0.01 to 10 wt %, preferably from 0.5 to 3 wt %, expressed in terms of the weight of the monomers.

Various poly(meth)acrylates may be used, which differ for example in terms of molecular weight or monomer composition.

In order to produce the light guide bodies according to the invention, the monomer mixtures may be cast into the desired shape and then polymerized. Both discontinuous and continuous casting methods may be employed as casting methods.

It is, however, also possible first to produce a moulding compound and form the light guide body therefrom.

Such particularly preferred moulding compounds are commercially available under the brand name PLEXI-GLAS® from Röhm GmbH.

The weight average of the molecular weight Mw of the moulding compounds may vary in wide ranges, the molecular weight usually been adapted to the application purpose and the way in which the moulding compound is processed. In general, however, it lies in the range of between 20,000 and 1,000,000 g/mol, preferably from 50,000 to 500,000 g/mol and particularly preferably from 80,000 to 300,000 g/mol, without this being intended to form any restriction.

After the titanium dioxide particles have been added, light guide bodies can be produced from these moulding compounds by conventional thermoplastic shaping methods. These include in particular extrusion and injection moulding.

In a particularly preferred embodiment, the light guide bodies according to the invention are produced by multi-component, preferably 2-component, injection moulding, only one component (moulding compound) containing the titanium dioxide particles and the other not containing any scattering particles. In this way, it is possible to produce light guide bodies in which the component containing titanium dioxide represents a particular pattern. In the switched-off state, that is to say without light entry, the shaped body appears as a homogeneous transparent shaped body, and the pattern cannot be seen. After switching on, however, the pattern can be seen since only the part of the shaped body which contains the titanium dioxide particles outputs the light.

In a preferred embodiment, the present invention therefore also relates to light guide bodies which have light scattering means and a haze according to claim 1 only in particular regions. The remaining regions are particularly preferably configured not to be light-scattering. In this way, for example, warning signs can be produced or also covers of for example vehicle cockpits, in which the warning symbols appear three-dimensionally highlighted after switching on ("floating symbols").

The freeform bodies according to the invention may preferably be produced by injection moulding or by thermoforming previously produced light guide plates. In particular, freeform bodies illuminating through the base of a thermoplastic may be produced. For example, a curved illuminating display in a motor vehicle interior or contours of a washing machine may be produced using thermoformed plates or directly by injection moulding.

By the obviation of printing, an additional process step and concomitant extra costs are avoided. In comparison with light guide bodies which are produced by means of injection moulding in structured moulds, a moulding compound according to the invention, comprising scattering bodies, makes it possible to obviate expensive structuring of the injection mould, and it furthermore allows shorter cycle times since no microstructures have to be formed precisely, as well as greater productivities. Furthermore, configuring microstructures in freeform surfaces is much more elaborate in terms of lighting technology.

As already mentioned, light guide bodies of the present invention may also be produced by casting methods. In this case, acrylic resin mixtures are preferably put into a mould and polymerized.

A preferred acrylic resin comprises, for example,
A) 0.1-100 wt.ppm of titanium dioxide particles having an average diameter in the range of from 150 to 500 nm,
B) 40-99.999 wt % of methyl methacrylate,
C) 0-59.999 wt % of the above-defined comonomers,
D) 0-59.999 wt % of polymers soluble in (B) or (C), the components A) to D) adding up to 100 wt %.

The acrylic resin furthermore comprises the initiators necessary for the polymerization. The components A to D and the initiators correspond to the compounds which are also used to produce suitable polymethyl methacrylate moulding compounds.

The moulding compounds and the acrylic resins may contain conventional additives of all types. These include inter alia antistatics, antioxidants, mould release agents, flameproofing agents, lubricants, dyes, flow enhancers, fillers, photostabilizers and organic phosphorus compounds such as phosphites or phosphonates, pigments, weathering protection agents and plasticizers.

The amount of additives is, however, restricted by the application purpose. For instance, the light guiding property of the polymethyl methacrylate light guide bodies must not be compromised too greatly by additives.

The light guide bodies of the present invention may be used to illuminate LCD displays, information signs and advertising panels. The light guide bodies according to the invention are particularly preferably employed as transparent glazing elements, which can be used as flat lights by switching on the light sources fitted on the light entry surfaces.

The light guide bodies according to the invention may furthermore be used to produce signs, display elements, advertising objects etc., which render particular symbols or signs visible only after switching on.

Measurement Methods:
Proportion of $TiO_2$ in the Light Guide Body

The light guide body is ashed. The mass of ash remaining is put in proportion to the mass of the light guide body. In this case, in the scope of the present invention, the entire mass of the ash is equated to the $TiO_2$ content.

Average Particle Size of the $TiO_2$ Particles in the Light Guide Body

Images of the light guide body are recorded using a transmission electron microscope. The particle diameter of the titanium dioxide particles embedded in the light guide body is determined by taking an average of the largest and smallest extent of the titanium dioxide particle in question. The average particle size is determined from 50 titanium dioxide particle diameters. The sample preparation of the light guide bodies for the electron microscopy study is carried out according to conventional methods known to the person skilled in the art.

Proportion of the Rutile Modification of the $TiO_2$ Particles

The modification of the titanium dioxide particles is determined by means of Raman spectroscopy. The proportion of rutile particles in relation to the particles measured overall is then determined. At least 100 titanium dioxide particles are preferably analysed. In order to increase the measurement accuracy, even more particles may be studied if necessary.

Luminance

The luminance is measured using a commercially available luminance measuring instrument (for example from LMT or Minolta).

The following examples serve to illustrate and further explain the present invention, but in no way restrict it.

Comparative Example 1

In a single-screw extruder, polymethyl methacrylate moulding compound was mixed with a master batch containing barium sulphate and melted. The resulting melt contained 160 wt.ppm of barium sulphate, expressed in terms of the weight of the polymethyl methacrylate, with an average particle size of 3 micrometers. The melt was removed from the extruder by means of a wide-slit nozzle and shaped into a polymethyl methacrylate plate in a smoothing mechanism. A rectangular light guide body with a length of 900 mm, a width of 500 mm and a thickness of 4 mm was cut from the polymethyl methacrylate plate. This light guide body was provided on all 4 mm thick edges (light entry surfaces) with light-emitting diodes which emit the light into the edges. A diffusely reflecting white sheet was arranged on one surface of the light guide body (light emitting surface 1). Centrally on the opposite surface of the light guide body (light emitting surface 2), the luminance was measured at various angles with respect to the surface normal of the light emitting surface 2 of the light guide body.

A sample piece with a length of 100 mm, a width of 100 mm and a thickness of 4 mm was cut from the same extruded light guide body, and the cloudiness of the 4 mm thick sample piece was measured.

Example 1

A 4 mm thick plate was formed as in Comparative Example 1, although it contains 1.2 wt.ppm of titanium dioxide with a particle size of 200 nm instead of barium sulphate. Luminance at various angles and the cloudiness were determined as in Example 1.

FIG. 4 shows that the luminance of the light guide body to which titanium dioxide is added is distributed more uniformly as a function of the angle with respect to the surface normal, compared with the luminance of a light guide body to which barium sulphate is added. It can furthermore be seen that the luminance in the direction of the surface normal, i.e. at the angle 0°, is higher for the plate comprising titanium dioxide than for the plate comprising barium sulphate.

The cloudiness of the titanium dioxide light guide body is furthermore much less than the cloudiness of the light guide body to which barium sulphate is added.

Example 2

To a polymerizable solution of polymethyl methacrylate in methyl methacrylate, 1.2 wt.ppm of titanium dioxide particles expressed in terms of the weight of the solution with an average particle size of 200 nm were added. A radical polymerization initiator, a UV absorber and a separating agent were added to the solution. The solution was introduced into a chamber consisting of two silicate glass sheets, which is provided with a circumferential sealing strip, and prepolymerized at 60° C. then finally polymerized at 120° C. A light guide body with a length of 900 mm and a width of 500 mm was cut from the 4 mm thick polymethyl methacrylate plate obtained in this way. The light guide body was provided on all sides with light-emitting diodes which emit their light into all the 4 mm thick edges (light entry surfaces) of the light guide body. A diffusely reflecting white sheet was arranged on one surface of the light guide body (light emitting surface 1). On the opposite surface of the plate (light emitting surface 2), the luminance was measured at various angles to the surface normal of the surface of the light guide body.

A sample piece with a length of 100 mm, a width of 100 mm and a thickness of 4 mm was cut from the same plate, and the cloudiness of the 4 mm thick sample piece was measured as a haze value.

FIG. 5 shows that in the light guide body produced by radical polymerization using the casting method, the luminance of the light guide body to which titanium dioxide is added is again uniform as a function of the angle with respect to the surface normal. It can furthermore be seen that, as in Example 1, the luminance of the light guide body comprising titanium dioxide in the direction of the surface normal is higher than in the light guide body comprising barium sulphate.

Table 1 compares the luminances of the extruded light guide body comprising 3 micrometer barium sulphate scattering particles from Comparative Example 1 with the extruded light guide body comprising 200 nm titanium dioxide scattering particles from Example 1 and the cast (radical polymerized) light guide body comprising 200 nm titanium dioxide scattering particles from Example 2.

Table 2 compares the cloudiness of the extruded light guide body comprising 3 micrometer barium sulphate scattering particles from Example 1 with the extruded light guide body comprising 200 nm titanium dioxide scattering particles from Example 2 and the cast (radical-polymerized) light guide body comprising 200 nm titanium dioxide scattering particles from Example 3. At the same thickness, the light guide bodies produced with titanium dioxide scattering particles have significantly less cloudiness, measured as haze, and are transparent when observed visually.

TABLE 1

|  | Scattering particles | Concentration [wt · ppm] | Luminance in surface normal direction [cd/m$^2$] |
|---|---|---|---|
| Comparative Example 1 | Barium sulphate | 160 | 580 |
| Example 1 | Titanium dioxide | 1.2 | 825 |
| Example 2 | Titanium dioxide | 1.2 | 783 |

TABLE 2

|  | Scattering particles | Concentration [wt · ppm] | Haze [%] |
|---|---|---|---|
| Comparative Example 1 | Barium sulphate | 160 | 21.07 |
| Example 1 | Titanium dioxide | 1.2 | 1.92 |
| Example 2 | Titanium dioxide | 1.2 | 1.47 |

Example 3

Freeform Body Exemplary Embodiment

A freeform body was produced from a light guide plate according to Example 1 by means of a thermoforming process. It had no printing on the surface and nevertheless exhibited the appearance of a uniform light.

Example 4

Floating Symbol Exemplary Embodiment

A floating navigation arrow in a motor vehicle instrument cluster was produced by the following technique:

By two-component injection moulding, the navigation arrow is injection moulded using a light-scattering moulding compound according to the invention. This arrow is embedded into a second glass-clear moulding compound component. This corresponds substantially to inlaying based on injection moulding.

The semifinished product was then placed centrally in an instrument cluster and illuminated from the side using LEDs. In the unilluminated state, the car driver sees through the fully transparent plate and does not perceive any contours. As a result of the illumination, the light passes through the glass-clear moulding compound as through a waveguide, and it is therefore not luminous. In the region of the navigation arrow, the light-scattering particles output the light and the contour of the navigation arrow is lit in a floating fashion. This technique can be applied to various symbol illuminations.

The invention claimed is:

1. A transparent glazing element, comprising a light guide body comprising at least one light entry surface, at least one light emitting surface, and 0.1-100 wt.ppm, expressed in terms of the weight of the light guide body, titanium dioxide light scattering particles, wherein the ratio of the light emitting surface to the light entry surface is at least 4, at least a portion of the light guide body has a haze, measured according to ASTM D1003, of less than 4%,
   the titanium dioxide light scattering particles have an average particle size of 150-500 nm.

2. The transparent glazing element according to claim 1, wherein at least 50% of the titanium dioxide light scattering particles are rutile titanium dioxide.

3. The transparent glazing element according to claim 1, wherein the ratio of the light emitting surface to the light entry surface is at least 20.

4. The transparent glazing element according to claim 1, wherein the light guide body comprises at least one transparent thermoplastic or thermoelastic plastic.

5. The transparent glazing element according to claim 1, wherein the titanium dioxide light scattering particles in the light guide body are present in an amount of 0.1-50 wt.ppm, expressed in terms of the weight of the light guide body, the titanium dioxide particles have an average particle size of from 160 to 450 nm, the haze is from 0.2 to 2%, or a combination thereof.

6. The transparent glazing element according to claim 1, wherein the light guide body does not have any printing defects, light-scattering defects, or both.

7. The transparent glazing element according to claim 1, wherein the light emitting surface of the light guide body is perpendicular to the light entry surface.

8. The transparent glazing element according to claim 1, wherein the light emitting surface of the light guide body is not perpendicular to the light entry surface.

9. The transparent glazing element according to claim 1, wherein the light guide body comprises at least 40 wt % of polymethyl methacrylate, expressed in terms of the weight of the light guide body.

10. The transparent glazing element according to claim 1, wherein the at least one portion of the light guide body that has a haze of less than 4% is not light scattering.

11. The transparent glazing element according to claim 1, wherein the titanium dioxide light scattering particles are present in the light guide body in an amount of 0.1-10 wt.ppm.

12. The transparent glazing element according to claim 1, wherein the titanium dioxide light scattering particles have an average particle size of from 170 to 400 nm.

13. The transparent glazing element according to claim 1, wherein at least a portion of the light guide body has a haze, measured according to ASTM D1003, of from 0.2 to 2%.

14. The transparent glazing element according to claim 1, wherein the light guide body has a freeform body shape.

15. The light guide body according to claim 9, wherein the light guide body comprises at least 60 wt %, expressed in terms of the weight of the light guide body, of polymethyl methacrylate.

* * * * *